(12) United States Patent
Nguyen et al.

(10) Patent No.: US 7,159,911 B2
(45) Date of Patent: Jan. 9, 2007

(54) FENDER CONFIGURATION FOR A VEHICLE, ESPECIALLY FOR A MOTOR VEHICLE

(75) Inventors: Ngoc-Dang Nguyen, Wolfsburg (DE); Dirk Becker, Klein Möringen (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/290,296

(22) Filed: Nov. 30, 2005

(65) Prior Publication Data

US 2006/0131901 A1 Jun. 22, 2006

Related U.S. Application Data

(63) Continuation of application No. PCT/EP2004/003839, filed on Apr. 10, 2004.

(30) Foreign Application Priority Data

May 30, 2003 (DE) ................. 103 24 460

(51) Int. Cl.
*B60R 19/02* (2006.01)
(52) U.S. Cl. ....................... 293/102
(58) Field of Classification Search ............. 293/102, 293/132, 135, 136; 296/187.04, 187.03, 296/187.09
See application file for complete search history.

(56) References Cited

U.S. PATENT DOCUMENTS

| | | | | |
|---|---|---|---|---|
| 3,506,295 | A * | 4/1970 | Yancey | 293/133 |
| 4,154,469 | A | 5/1979 | Goupy et al. | |
| 4,671,550 | A | 6/1987 | Molnar | |
| 5,139,297 | A * | 8/1992 | Carpenter et al. | 293/132 |
| 5,435,619 | A | 7/1995 | Nakae et al. | |
| 5,780,129 | A * | 7/1998 | Ohta | 428/35.7 |
| 6,080,463 | A * | 6/2000 | Togawa et al. | 428/120 |
| 6,082,792 | A * | 7/2000 | Evans et al. | 293/133 |
| 6,227,582 | B1 * | 5/2001 | Ichien | 293/132 |
| 6,270,131 | B1 * | 8/2001 | Martinez et al. | 293/132 |
| 6,290,272 | B1 | 9/2001 | Braun | |
| 6,315,339 | B1 * | 11/2001 | Devilliers et al. | 293/132 |
| 6,726,262 | B1 | 4/2004 | Marijnissen et al. | |
| 6,746,061 | B1 * | 6/2004 | Evans | 293/120 |
| 6,908,127 | B1 * | 6/2005 | Evans | 293/120 |
| 7,004,519 | B1 * | 2/2006 | Roussel et al. | 293/120 |
| 2003/0020291 | A1 | 1/2003 | Roussel et al. | |
| 2003/0080573 | A1 * | 5/2003 | Marijnissen et al. | 293/132 |

FOREIGN PATENT DOCUMENTS

| | | |
|---|---|---|
| DE | 27 41 969 A1 | 3/1978 |
| DE | 699 03 417 T2 | 11/1999 |
| DE | 198 61 026 A1 | 6/2000 |
| DE | 101 43 532 A1 | 3/2003 |

(Continued)

*Primary Examiner*—H Gutman (57) ABSTRACT

A bumper for a vehicle contains a bumper cross beam extending in a transversal direction of the vehicle, a bumper cover forming the external face of the bumper, and an energy-absorbing insert disposed at least in parallel between the mounted bumper cross beam and the bumper cover. The insert has a plurality of deformation cavities and/or deformation free spaces. The insert has a first boundary layer, a medial layer, and a second boundary layer. The medial layer has a different energy absorptive capacity than the two boundary layers and is associated with the bumper cross beam. The deformation cavities and/or deformation free spaces are embodied in the medial layer such that in case of a collision, the insert is plastically deformable at least partially in the transversal and/or longitudinal direction of the vehicle along a small part of a block length to absorb energy.

16 Claims, 5 Drawing Sheets

FOREIGN PATENT DOCUMENTS

| | | |
|---|---|---|
| EP | 0 947 727 A1 | 10/1999 |
| EP | 1 046 546 A1 | 10/2000 |
| EP | 1 076 619 B1 | 10/2002 |
| FR | 2 817 815 A1 | 6/2002 |
| JP | 355164537 A * 12/1980 | ................ 293/109 |
| JP | 356099837 A * 8/1981 | ................ 293/132 |
| JP | 357087742 A * 6/1982 | ................ 293/102 |
| JP | 358078844 A * 5/1983 | ................ 293/102 |
| JP | 358177747 A * 10/1983 | ................ 293/102 |
| JP | 358202132 A * 11/1983 | ................ 293/136 |
| JP | 358206447 A * 12/1983 | ................ 293/132 |
| JP | 11 208389 | 8/1999 |
| WO | 03/037688 A1 | 5/2003 |
| WO | WO 03/072399 A2 | 9/2003 |

* cited by examiner

FENDER CONFIGURATION FOR A VEHICLE, ESPECIALLY FOR A MOTOR VEHICLE

CROSS-REFERENCE TO THE RELATED APPLICATION

This is a continuing application, under 35 U.S.C. §120, of copending international application No. PCT/EP2004/003839, filed Apr. 10, 2004, which designated the United States; this application also claims the priority, under 35 U.S.C. §119, of German patent application No. 103 24 460.3 filed May 30, 2003; the prior applications are herewith incorporated by reference in their entirety.

BACKGROUND OF THE INVENTION

Field of the Invention

The invention relates to a fender configuration for a vehicle, especially for a motor vehicle. The fender configuration includes at least one fender cross member running in a vehicle front end region in a transverse direction of the vehicle, a fender cover which forms an outer skin of the fender configuration, and at least one energy-absorbing insert, which, in the assembled state, is disposed at least regionally between the fender cross member and the fender cover. A plurality of deformation recesses and/or deformation clearances are provided in the insert.

A fender configuration of the generic type for a vehicle, known from published, non-prosecuted German patent application DE 100 42 560 A1, contains at least one fender cross member running in the vehicle front end region in the transverse direction of the vehicle. A fender cover forms the outer skin of the fender configuration. Between the fender cross member and the fender cover there is disposed, at least regionally, at least one energy-absorbing insert, a plurality of deformation recesses and/or deformation clearances being provided in the insert.

In this fender configuration, the fender cross member, which is connected by two connecting elements, as so-called model damage elements, to the longitudinal members of the vehicle body, creates a standard deformation region for vehicle and passenger protection. In addition, the insert, which is disposed in front of the fender cross member and is realized as a deformation molding, creates a further deformation region, as a pedestrian impact protection, which is deformable under the action of a relatively low force. In order to be able to achieve adequate pedestrian protection, the deformation molding must be correspondingly dimensioned so that, in a collision with a pedestrian, the leg of the pedestrian may penetrate the deformation molding, with correspondingly large energy absorption, with the result that the pedestrian escapes largely without injury. The deformation molding is made of a foam material, so that, disadvantageously, from a certain penetration depth, no further deformable block length remains and thus the full material thickness of the deformation molding cannot be utilized as the deformation path. Hence, the material thickness of the deformation molding in the non-deformed state, as a result of the deformation path necessary for an adequate pedestrian protection and of the herein remaining block length of the deformation molding, disadvantageously becomes relatively large. As a result of the deformation recesses and/or deformation clearances configured in the deformation molding, which are configured as a lattice and/or honeycomb structure, a deformation molding is obtained which has relatively little weight, yet, due to the drawbacks described above, is relatively largely dimensioned for adequate pedestrian protection.

From European patent EP 1 046 546 B1, a fender configuration is known in which, between a fender cover and an assembly element by which the fender cover can be connected to the vehicle body, a spacing exists which is filled with an absorber foam. In the assembled state of the fender configuration, the absorber foam exhibits in the vertically lower part an increased rigidity in comparison to the absorber foam in the upper region of the spacing between the fender cover and the assembly element. The relatively rigid lower part of the absorber foam is an integral component part of the fender and extends forward in the direction of travel in relation to the upper part of the absorber foam. The spacing between the fender cover and the assembly element is in this case fully filled with the absorber foam. Here too, the material thickness of the absorber foam, viewed in the direction of travel, must disadvantageously be made correspondingly large in order to obtain adequate pedestrian protection.

From European patent EP 0 947 727 A1, a fender configuration is known in which an energy-absorbing foam structure is disposed between a fender cover and a fender cross member. The foam structure is built up of three foam layers disposed parallel to the force transmission direction and have different energy absorbencies. Here too, if it is penetrated, for example, by the leg of a pedestrian in a collision with the same, the deformation path of the foam structure is limited since, following initial deformation of the foam structure, a non-deformable residual block length of the individual foam layers remains. In order thus to ensure adequate pedestrian protection, the foam structure, viewed in the direction of travel, must be configured correspondingly large, which is often not possible from the spatial engineering aspect.

Furthermore, from U.S. Pat. No. 5,435,619, a fender configuration is known in which a fender cover of a C-shaped configuration in cross section, in the assembled state, overgrips an energy absorption element disposed in the fender cross member. The energy absorption element is formed from a plurality of parallel tube sections, the axial alignment of the tube sections approximately corresponding to the direction of travel of the motor vehicle. On the inner side of the fender cover there are configured elevations which jut out in the shape of a pin and which, in the assembled state of the fender cover, jut into the tube sections of the energy absorption element. From the rear side of the fender cross member, the pin-shaped elevations of the fender cover are connected by bolts to the fender cross member. A wholly stable structure of the fender configuration is thus created, which is only of limited use with energy absorption characteristics with respect to an impact with, for example, a pedestrian.

SUMMARY OF THE INVENTION

It is accordingly an object of the invention to provide a fender configuration for a vehicle, especially for a motor vehicle which overcomes the above-mentioned disadvantages of the prior art devices of this general type, in which a compact structure of the fender configuration is combined with a good pedestrian protection.

With the foregoing and other objects in view there is provided, in accordance with the invention, a fender configuration for a vehicle. The fender configuration includes at least one fender cross member disposed in a vehicle front end region in a transverse direction of the vehicle, a fender cover forming an outer skin of the fender configuration, and at least one energy-absorbing insert. The insert in an assembled state is disposed at least regionally between the fender cross member and the fender cover. The energy-absorbing insert has a plurality of deformation recesses and/or deformation clearances. The energy-absorbing insert is constructed in three layers including a first insert outer layer functioning as a first energy absorption layer, an insert middle layer functioning as a second energy absorption layer, and a second insert outer layer functioning as a third energy absorption layer. The insert middle layer has a different energy absorbency than the first and second insert outer layers. The insert middle layer is associated with the fender cross member such that, in the assembled state of the energy-absorbing insert, the insert middle layer is disposed approximately level with the fender cross member. The deformation recesses and/or the deformation clearances are configured in the insert middle layer such that, in a collision, if a force acts upon the fender cover, the energy-absorbing insert, in utilizing the deformation recesses and/or the deformation clearances, are at least regionally plastically deformable in the transverse direction of the vehicle and/or in a longitudinal direction of the vehicle, with a small block length for energy absorption.

The insert is constructed in three layers including a first insert outer layer as a first energy absorption layer, an insert middle layer as a second energy absorption layer, and a second insert outer layer as a third energy absorption layer. The insert middle layer has a different energy absorbency than the two insert outer layers. Moreover, the insert middle layer is assigned to the fender cross member such that, in the assembled state of the insert, the insert middle layer is disposed approximately level with the fender cross member. The deformation recesses and/or the deformation clearances are configured in the insert middle layer.

An advantage with such a fender configuration is that, in a collision, if a force acts upon the fender cover, the insert, in utilizing the deformation recesses and/or the deformation clearances, is at least regionally plastically deformable in the transverse direction of the vehicle and/or in the longitudinal direction of the vehicle, with a small block length for energy absorption. In a collision, the insert middle layer can thus be deformed such that the insert middle layer can buckle, for example, in the transverse direction of the vehicle through utilization of the deformation recesses and/or the deformation clearances, whereby the no further deformable block length of the insert in the region of the insert middle layer can advantageously be reduced. In the configuration of the insert middle layer in front of the fender cross member, viewed in the direction of travel, the spacing between the fender cross member and the fender cover can thus be kept relatively small, since the configuration of the deformation recesses and/or of the deformation clearances in the insert middle layer, even with a smaller material thickness viewed in the direction of travel, gives good energy absorption characteristics in an impact with, for example, a pedestrian.

In one refinement, the three energy absorption layers, in the assembled state of the insert, viewed in the direction of the vehicle vertical axis, are disposed one above the other. In a preferred embodiment, the energy absorption layers can extend respectively over the whole of the insert width. A constantly good pedestrian protection is thus ensured over the whole of the width of the insert. If the insert is disposed over the whole of the width of the fender cross member, then a good pedestrian protection can be obtained even in a collision with a pedestrian in the lateral border region of the fender configuration. In principle, a structure formed of more than three energy absorption layers of the insert is possible, though it should be borne in mind, from the production engineering aspect, that the manufacturing costs, which are increased by the added number of energy absorption layers, are directly related to the increase in energy absorbency of the insert.

In a further embodiment, the two insert outer layers can be made of a foam material and have approximately equal density. Thus, the insert outer layers are configured with a substantially equal energy absorbency. The manufacture of the insert is thereby simplified, since, despite a three-layered structure of the insert, only two different materials are necessary to make the insert.

In a preferred embodiment, the two insert outer layers can be made of a harder foam material and the insert middle layer can be made of a foam material which is softer than the foam material of the insert outer layers. The precise specification of the hardness or softness of the foam material can be fixed according to requirements of the specific embodiment of the insert and of the entire fender configuration.

In one refinement, the two insert outer layers can be fixedly connected one to the other respectively with the insert middle layer, at least regionally, in at least one plane contact region for the configuration of the insert. In a preferred embodiment, the insert outer layers can respectively be joined to the insert middle layer with foam or bonded fixedly together. In total, therefore, a one-piece insert is created, whereby the fitting of the insert between the fender cross member and the fender cover is advantageously simplified.

In a particularly preferred embodiment, the insert, viewed in cross section, can be configured, at least regionally, in a U-shape. In the assembled state of the insert, the two insert outer layers here project with a respective outer layer arm region, counter to the direction of travel, over the insert middle layer for the configuration of the two U-legs. A respective outer layer base region, which together with the corresponding outer layer arm region forms the insert outer layer, forms together with the intermediate insert middle layer the U-base. In the assembled state, the insert overgrips the fender cross member in approximate form closure, so that the two outer layer arm regions of the insert and the insert middle layer bear at least regionally in a plane contact joint against the fender cross member. As a result of the U-shaped configuration of the insert, this can be easily fitted to the fender cross member by being pushed on. In an advantageous refinement, moreover, on the back of the insert, which, in the assembled state of the insert, is assigned to the fender cross member, adhesive strips are provided, with which, at least punctually, a fixation of the insert by an adhesive joint is possible in order further to facilitate the fitting of the insert to the fender cross member. Due to the configuration of plane contact joints between the insert and the fender cross member, the insert is reliably supported against the fender cross member in a collision.

In one refinement, the fender cross member, viewed in cross section, can be configured at least regionally in a U-shape. In the assembled state of the fender cross member, the two U-legs are here disposed approximately horizontally and point counter to the direction of travel, the U-base being disposed approximately vertically. On the two U-legs of the fender cross member there is respectively disposed a supporting bracket running, at least in the region of the insert outer layers, in the transverse direction of the vehicle. Thus, in the assembled state, the two insert outer layers can be respectively supported against the assigned supporting bracket in a collision. As a result of the U-shaped configuration of the fender cross member, an, all in all, stable structural part of relatively low weight is created. As a result of the supporting brackets disposed on the U-legs of the fender cross member, a reliable support is created for the insert outer layers in a collision, so that, in the assembled state of the insert on the fender cross member, for all three layers a support is created, namely the supporting brackets for the insert outer layers and the U-base of the fender cross member for the insert middle layer. The outer layer arm regions of the insert outer layers are here constructed in length, viewed in the direction of travel, such that, resting on the respectively assigned U-legs of the fender cross member, they reach respectively up to the supporting bracket on the fender cross member.

In a concrete embodiment, a plurality of knob-like deformation pots can be configured on the insert middle layer, the pot interiors forming the deformation recesses. The easy-to-make deformation pots on the insert middle layer can buckle in a collision, for example with a pedestrian, into the deformation recesses formed by the pot interiors, whereby the no further deformable block length of the insert is advantageously reduced in the region of the insert middle layer. Thus, the construction space between fender cross member and fender cover which is necessary for an optimal pedestrian protection can be kept small, whereby the freedom of design in the region of the fender configuration is advantageously enhanced.

In one refinement, the pot bottoms of the deformation pots, in the assembled state of the insert, point in the direction of the fender cross member. In a preferred embodiment, the pot bottoms of the deformation pots bear against the fender cross member. The pot bottom of each deformation pot, which pot bottom points in the direction of the fender cross member, is disposed in such a way in the assembled state of the insert that in normal driving operation freedom from rattling between the two structural parts is ensured and, in a collision, the pot bottom can rest against the fender cross member and thus the deformation path which is necessary in the case of a pedestrian collision is given by a buckling of the pot walls into the deformation recesses. In principle, the deformation pots can also be constructed without pot bottoms, so that they are supported against the fender cross member with the respectively assigned end faces of the pot walls.

In a further embodiment, the side lying opposite each pot bottom of the deformation pots can be openly configured. In this embodiment, the deformation pots on the insert are easy to make, for example by deep-drawing. In injection molding, a simple demolding is ensured by the open side of the deformation pots. In principle, the side lying opposite the pot bottom can also be of closed configuration or the deformation pots can be openly configured on both sides.

In a particularly preferred embodiment, the deformation pots can be approximately rectangularly configured. In this case, at least those pot walls which run approximately vertically in the assembled state of the insert can run conically, so that the surface area of the respective pot bottom is smaller than the surface area of the opposite-lying side. Deformation clearances can thus be configured between the approximately vertically running pot walls. Hence, in a collision, the prospect of buckling of the insert middle layer is advantageously improved by the deformation clearances additional to the deformation recesses formed by the pot interiors. In that cross section through the insert middle layer which is defined by a plane spanned through the longitudinal direction of the vehicle and transverse direction of the vehicle, the pot walls of the deformation pots, which can be arranged side by side over the insert width on the insert middle layer, run in a zigzag pattern. In a collision, for example with a leg of a pedestrian, the deformation recesses and the deformation clearances thus allows the insert middle layer to buckle in concertina-like fashion in the transverse direction of the vehicle, whereby the available deformation path is advantageously enlarged in comparison to an insert made from solid foam material of the same thickness.

In an alternative embodiment to the deformation pots, the insert middle layer can be formed by a plurality of deformation webs, which, in the assembled state of the insert, run in the direction of the vehicle vertical axis. The deformation clearances are in this case disposed between the deformation webs. Here too, a buckling of the deformation webs into the deformation clearances in a collision is reliably ensured. The remaining residual block length of the insert middle layer is thus advantageously reduced.

In one refinement, the deformation webs, viewed in cross section, can be rectangularly configured, a narrow web end face pointing respectively in the direction of travel. Thus, together with the insert outer layers, a stable insert is created, which in the region of the insert middle layer, due to the deformation webs with the intervening deformation clearances, ensures a good pedestrian protection on the basis of reduced residual block length.

The two insert outer layers can be easily made from a solid foam material, since, in the assembled state of the insert, the insert outer layers are disposed respectively above and below the fender cross member and thus grip over the latter, whereby a greater deformation path is available compared to the insert middle layer. Thus, the greater residual block length of the solid foam material of the insert outer layers compared to a version of the foam material having deformation recesses and/or deformation clearances does not result in any restriction or reduction of the pedestrian protection. In principle, deformation recesses and/or deformation clearances can also be configured in the insert outer layers, so that, in a collision, a buckling, preferably in the transverse direction of the vehicle, is possible also in the region of the insert outer layers, thereby enlarging the deformation path.

In a further embodiment, in the assembled state of the fender configuration, that side of the insert which is facing the fender cover can run along the inner contour of the fender cover. In an advantageous refinement, a constantly small gap distance is configured between the insert and the inner contour of the fender cover. The fender cover is thereby stabilized such that, if the vehicle is pushed, for example, an unwelcome denting of the fender cover is prevented. The force transmitted by the pushing is hereupon transmitted to the fender configuration via the insert, which rests against the fender cross member and thus acts as a spacer, to the longitudinal members of the vehicle body.

Other features which are considered as characteristic for the invention are set forth in the appended claims.

Although the invention is illustrated and described herein as embodied in a fender configuration for a vehicle, especially for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
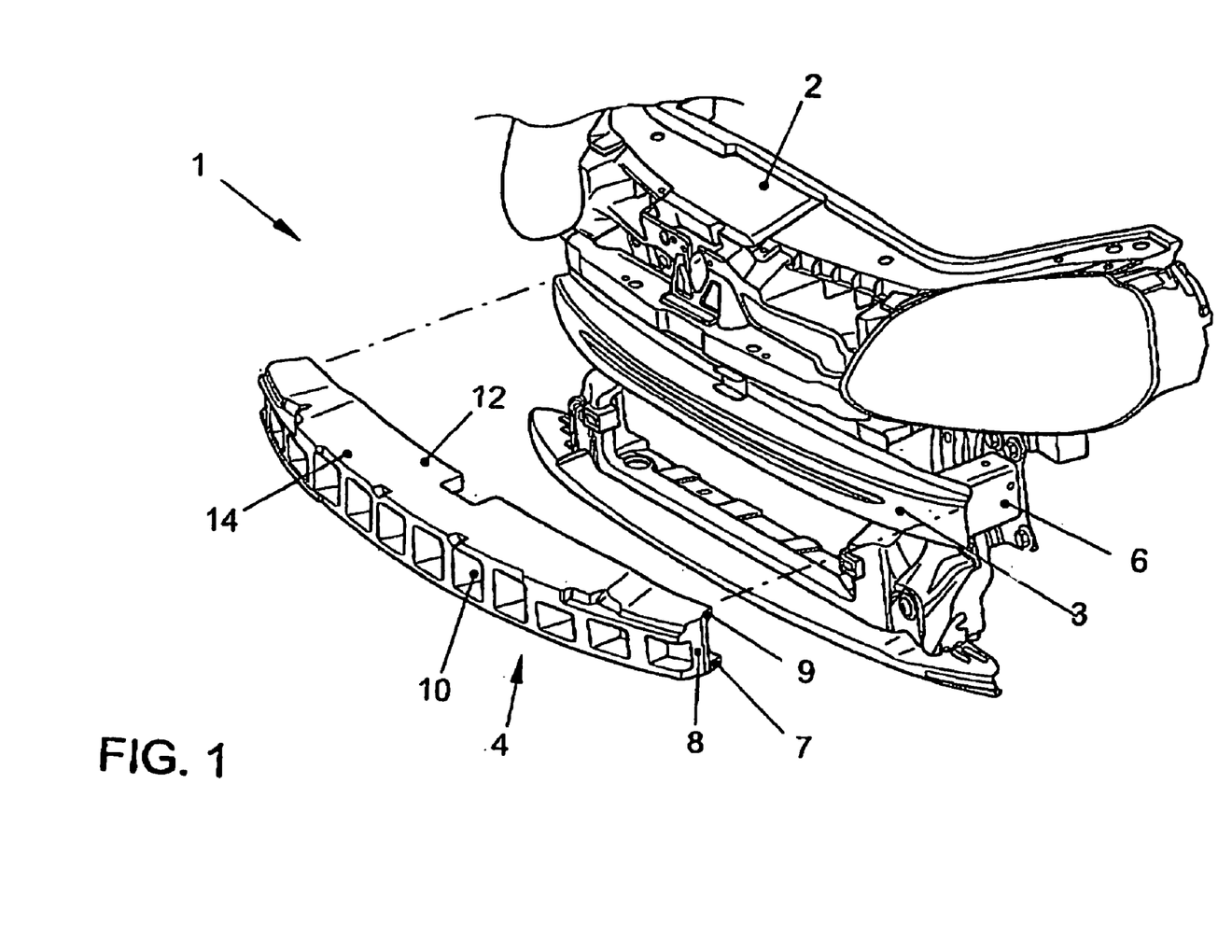
FIG. 1 is a diagrammatic, exploded perspective view of a fender configuration having an insert on a vehicle front end according to the invention.

Referring now to the figures of the drawing in detail and first, particularly, to FIG. 1 thereof, there is shown a diagrammatic perspective representation of a fender configuration 1 on a vehicle front end 2. The fender configuration 1 is formed by a fender cross member 3, an insert 4 and a fender cover 5 which, for reasons of clarity, is not shown in FIG. 1. The fender cross member 3 is fixedly connected to the vehicle front end 2 by two model damage elements 6, which are respectively disposed at both ends of the fender cross member 3, viewed in the transverse direction of the vehicle. The insert 4, which in FIG. 1 is shown in an exploded representation in front of the fender cross member 3, is pushed during assembly onto the fender cross member 3 and overgrips the latter (see also FIG. 2). In the ready-assembled state of the fender configuration 1, the insert 4, which has energy-absorbing properties, is disposed between the fender cross member 3 and the fender cover 5. In the embodiment of the insert 4 which is represented in FIG. 1, which insert, viewed in the direction of the vehicle vertical axis, is built up of a first insert outer layer 7, an insert middle layer 8 and a second insert outer layer 9. A plurality of deformation pots 10 are configured in the insert middle layer 8. The deformation pots 10 are disposed side by side over a full width of the insert 4. The pot interiors of the deformation pots 10 here respectively form a deformation recess. That side of the deformation pots 10 which, in the assembled state of the insert 4, is assigned to the fender cover 5 is in each case open in design.

Figure 2:
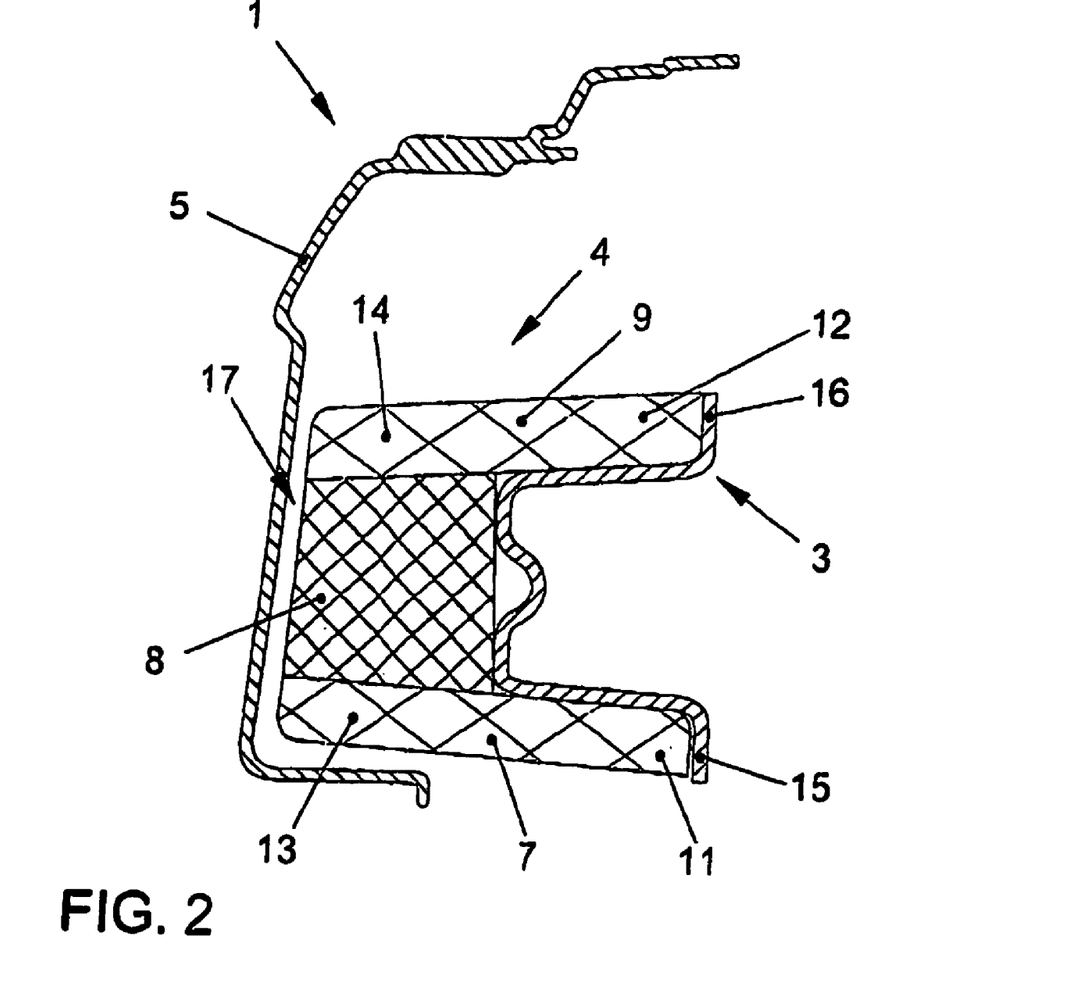
FIG. 2 is a diagrammatic, sectional view through the fender configuration in a direction of a vehicle vertical axis.

FIG. 2 shows diagrammatically a sectional representation in the direction of the vehicle vertical axis through the fender configuration 1. The structure of the insert 4, formed of the first insert outer layer 7, the insert middle layer 8 and the second insert outer layer 9, is here discernible. The insert 4, viewed in cross section, is configured in total in a U-shape, in the assembled state of the insert 4 the two insert outer layers 7 and 9 projecting over the insert middle layer 8 with a respective outer layer arm region 11 and 12 counter to the direction of travel. A respective outer layer base region 13 and 14, which respectively, together with the corresponding outer layer arm region 11 and 12, configures the insert outer layer 7 and 9, forms together with the intervening insert middle layer 8 the U-base, the U-legs of the insert 4 being configured by the outer layer arm regions 11 and 12. In the assembled state, the insert 4 overgrips the fender cross member 3 in form closure, so that the two outer layer arm regions 11 and 12 of the insert 4 and the insert middle layer 8 bear in a plane contact joint against the fender cross member 3. The fender cross member 3 is likewise configured in a U-shape, in the assembled state of the fender cross member 3 the two U-legs being disposed approximately horizontally and pointing counter to the direction of travel and the U-base being disposed approximately vertically. On the two U-legs of the fender cross member 3 there is respectively disposed a supporting bracket 15 and 16 running in the transverse direction of the vehicle, so that, in the assembled state, the two insert outer layers 7 and 9 can rest in a collision with the respective outer layer arm regions 11 and 12 against the assigned supporting bracket 15, 16. That side of the insert 4 which, in the assembled state of the fender configuration 1, is facing the fender cover 5 runs with small gap distance 17 along the inner contour of the fender cover, so that, if the vehicle is pushed, for example, the force which then acts upon the fender cover 5 does not cause it to dent, but rather to be supported against the insert 4. As a result of the gap distance 17 configured between the fender cover 5 and the insert 4, a reliable assembly of the fender configuration 1 is possible, even given tolerance-conditioned deviations of the involved structural parts.

Figure 3:
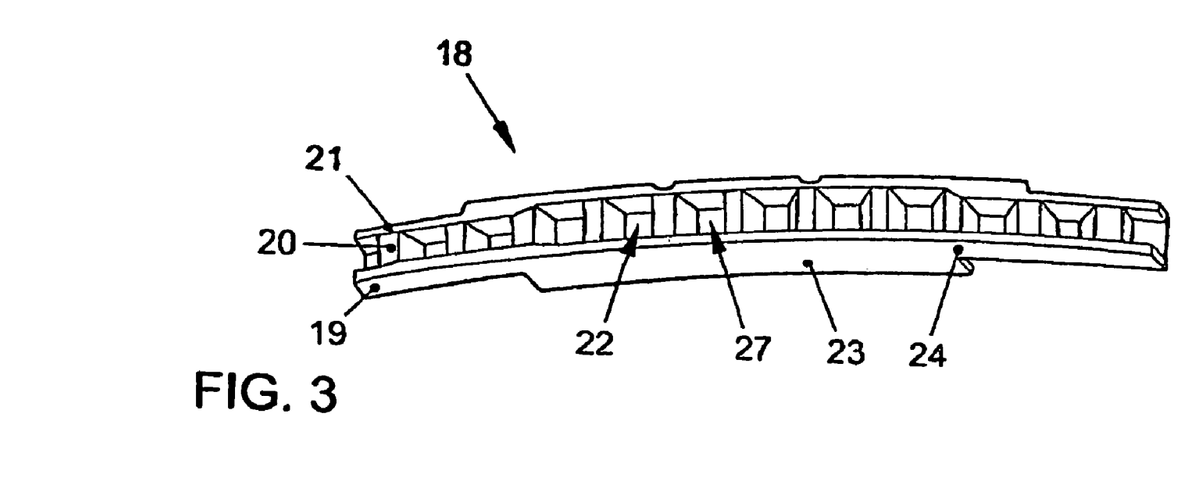
FIG. 3 is diagrammatic, perspective view of an insert in a further embodiment.

FIG. 3 shows diagrammatically a perspective representation of a further embodiment of an insert 18. Here too, the basic structure of the insert 18 includes an insert outer layer 19, an insert middle layer 20 and an insert outer layer 21. In the assembled state of the insert 18, the three layers 19, 20 and 21, viewed in the direction of the vehicle vertical axis, are disposed one above the other. In the insert middle layer 20, a plurality of mutually adjacent deformation pots 22 disposed over the full width of the insert 18 are configured. In the middle region related to the transverse direction of the vehicle in the assembled state of the insert 18, the latter, viewed in cross section, is configured in a U-shape, the U-legs being formed by outer layer arm regions 23, which are a constituent part of the insert outer layers 19 and 21. The U-base is formed by the insert middle layer and the respective outer layer base region 24 of the insert outer layers 19 and 21.

Figure 4:
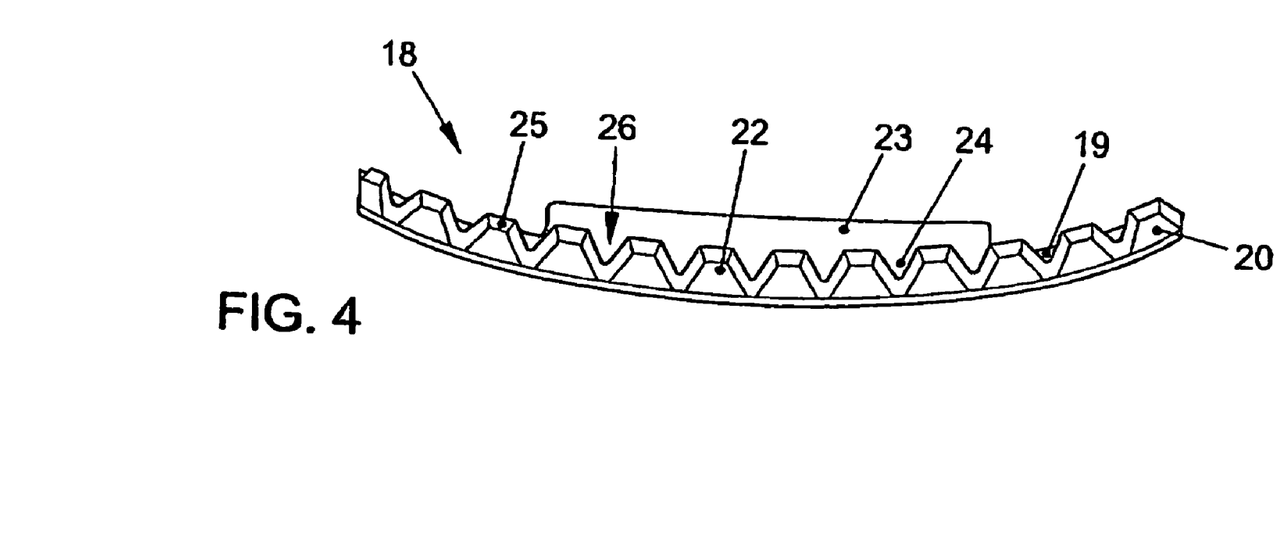
FIG. 4 is a diagrammatic, top plan view of the insert shown in FIG. 3.

From the top view which is represented diagrammatically in FIG. 4 and in which the insert outer layer 21 is omitted, the configuration of the deformation pots 22 on the insert middle layer 20 is discernible. The deformation pots 22 are here rectangularly configured in terms of their basic shape, those pot walls which run vertically in the assembled state of the insert 18 running conically, so that the surface area of the respective pot bottom 25 is smaller than the surface area of the opposite side. Thus, between the vertically running pot walls, deformation clearances 26 are configured. In addition to the deformation clearances 26, deformation recesses 27 are configured by the pot interiors of the deformation pots 22, so that, in a collision, the deformation pots 22 can buckle into the deformation clearances 26 and/or into the deformation recesses 27 so as to produce a small residual block length of the insert middle layer 20. In the assembled state of the insert 18 on the fender cross member 3 (here not jointly represented), the outer layer arm regions 23 of the insert outer layers 19 and 21 grip over the fender cross member analogously to the embodiment of the insert 4 represented in FIG. 2. Here too, therefore, especially in the region of the insert middle layer 20, in which there is only a small deformation path between the fender cover and the fender cross member, a good pedestrian protection is ensured due to the prospect of the deformation pots 22 of the insert middle layer 20 buckling into the deformation clearances 26 and/or into the deformation recesses 27.

Figure 5:
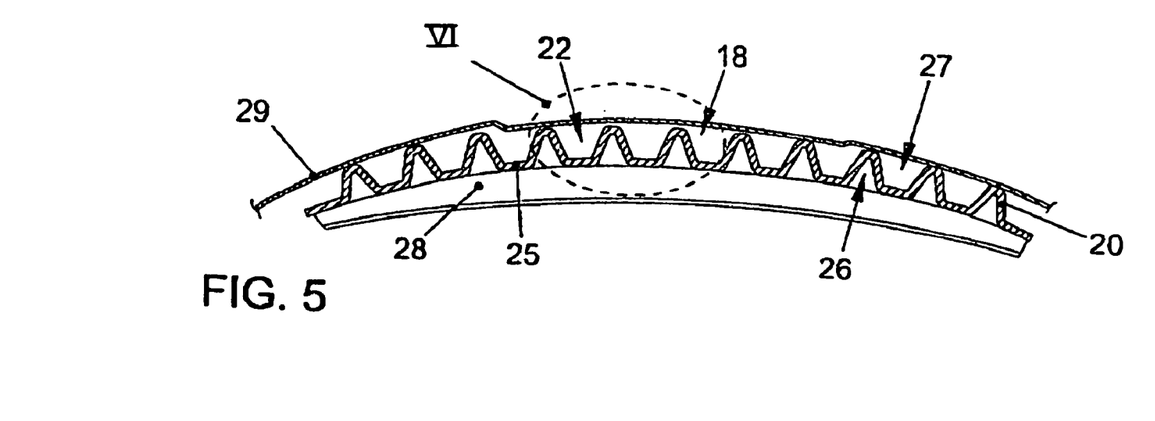
FIG. 5 is a diagrammatic, sectional view of a horizontal section in the transverse direction of the vehicle through the fender configuration with the insert of FIG. 3 in the assembled state.

FIG. 5 shows diagrammatically in a horizontal plane a sectional representation of the insert 18 through the insert middle layer 20, the insert 18, in the assembled state, being shown between a fender cross member 28 and a fender cover 29. As a result of the conically running pot walls of the deformation pots 22, a zigzag pattern is obtained in total in the insert middle layer 20, so that in a collision, for example with a pedestrian, a buckling of the deformation pots 22 into the deformation clearances 26 and/or into the deformation recesses 27 is reliably ensured.

Figure 6:
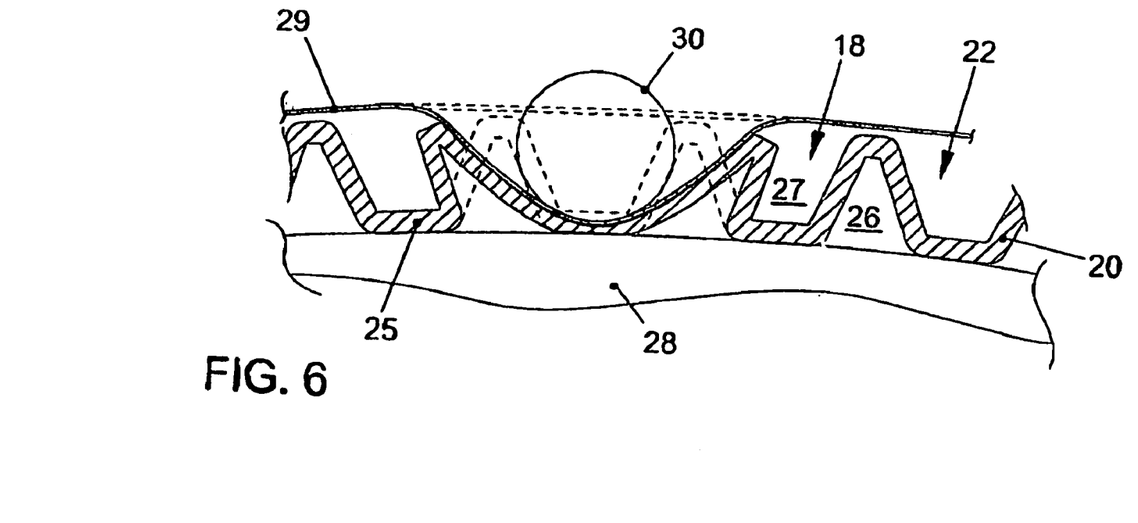
FIG. 6 is a diagrammatic, enlarged sectional view of detail VI shown in FIG. 5 in a collision.

FIG. 6 shows diagrammatically an enlarged representation of the detail VI shown in FIG. 5. Here, the collision with a leg 30 (represented diagrammatically) of a pedestrian is shown. The fender cover 29 is thereby dented in the direction of the fender cross member 28 and the deformation pots 22, due to their zigzag configuration, yield in the transverse direction of the vehicle into the deformation clearances 26 and/or deformation recesses 27. Thus, almost the whole of the construction space between the fender cover 29 and the fender cross member 28 is available as a deformation path. Due to the construction with deformation pots 22 and intervening deformation clearances 26 and deformation recesses 27, the residual block length of the insert middle layer 20 can be largely neglected. A good pedestrian protection is consequently obtained, despite the only small amount of construction space available between the fender cross member 28 and the fender cover 29.

Figure 7:
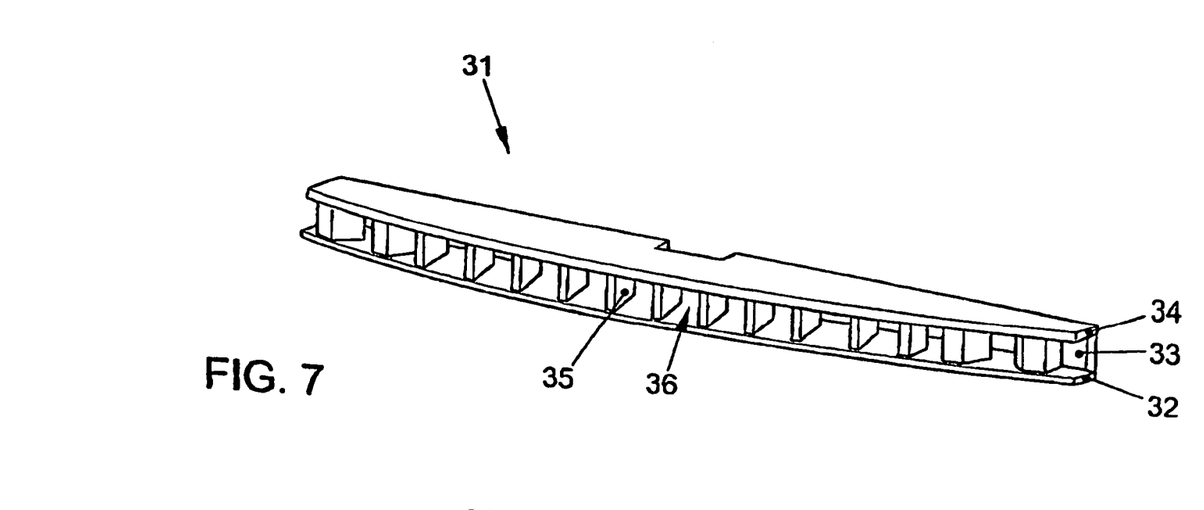
FIG. 7 is a diagrammatic, perspective view of the insert in a further embodiment from the front.
Figure 8:
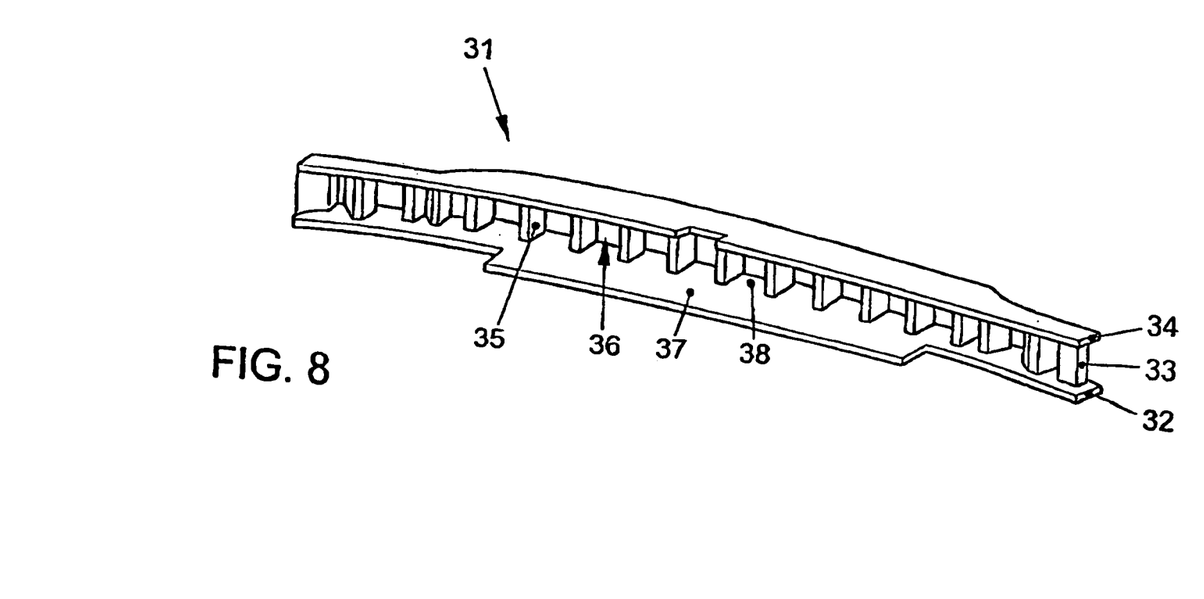
FIG. 8 is a diagrammatic, perspective view of the insert shown in FIG. 7 from the rear.

FIG. 7 shows diagrammatically a perspective representation from the front of a further embodiment of an insert 31. Here too, the insert 31 is built up of a first insert outer layer 32, an insert middle layer 33 and a second insert outer layer 34. The insert middle layer 33 here formed of deformation webs 35, which are plurally arranged evenly distributed over the width of the insert 31. Between the deformation webs 35, deformation clearances 36 are respectively configured, so that here too, in a collision, the deformation webs 35 forming the insert middle layer 33 can buckle in the direction of the deformation clearances 36. Viewed in cross section, the deformation webs are rectangularly configured, a narrow web end face of the deformation webs 35 respectively pointing in the direction of travel. The insert 31 in cross section, viewed in the direction of the vehicle vertical axis, is configured in total in a U-shape, the U-legs formed by an outer layer arm region 37 being configured only in a middle region of the insert 31, related to the transverse direction of the vehicle. The U-base is configured by the insert middle layer 33 and an outer layer base region 38, which, together with the outer layer arm region 37, configures the insert outer layers 32 and 33. This is clearly apparent from FIG. 8, in which a perspective rear view of the insert 31 is represented diagrammatically.

All in all, irrespective of the embodiment of the insert 4, 18 and 31, good pedestrian protection is created, since, in the region between the fender cross member 3, 28 and the fender cover 5, 29, through the configuration, for example, of deformation pots 10, 22 or deformation webs 35 with correspondingly assigned deformation clearances 26, 36 and deformation recesses 27 respectively in the insert middle layer 8, 20, 33, in a collision a deformation of the insert middle layer 8, 20, 33 with a small residual block length is possible. The insert middle layer 8, 20, 33 can hereupon buckle into the deformation clearances 26, 36 and the deformation recesses 27, preferably in the transverse direction of the vehicle. The insert outer layers 7, 9, 19, 21, 32, 34 can be made, for example, of an energy-absorbing solid material, preferably a foam material, since, in the region of the insert outer layers 7, 9, 19, 21, 32, 34, due to the fitting of the insert 4, 18, 31 such that it overgrips the fender cross member 3, 28, a larger deformation path is available, so that, even in the case of a corresponding residual block length given by the solid foam material, a good pedestrian protection is ensured. The construction of the insert outer layers 7, 9, 19, 21, 32, 34 and of the insert middle layers 8, 20, 33 in relation to the used density of the foam material can be defined according to the requirements of the respective fender configuration 1.

We claim:

1. A fender configuration for a vehicle, the fender configuration comprising:
    at least one fender cross member disposed in a vehicle front end region in a transverse direction of the vehicle;
    a fender cover forming an outer skin of the fender configuration; and
    at least one energy-absorbing insert, in an assembled state, disposed at least regionally between said fender cross member and said fender cover, said energy-absorbing insert having at least one of a plurality of deformation recesses and deformation clearances formed therein, said energy-absorbing insert being constructed in three layers including a first insert outer layer functioning as a first energy absorption layer, an insert middle layer functioning as a second energy absorption layer, and a second insert outer layer functioning as a third energy absorption layer, said insert middle layer having a different energy absorbency than said first and second insert outer layers, said first and second insert outer layers being made of a foam material and having approximately equal density with substantially equal energy absorbency, said insert middle layer being associated with said fender cross member such that, in the assembled state of said energy-absorbing insert, said insert middle layer is disposed approximately level with said fender cross member, and said at least one of said deformation recesses and deformation clearances are configured in said insert middle layer such that, in a collision, if a force acts upon said fender cover, said enemy-absorbing insert, in utilizing said at least one of said deformation recesses and said deformation clearances, is at least regionally plastically deformable in at least one of the transverse direction of the vehicle and in a longitudinal direction of the vehicle, with a small block length for energy absorption.

2. The fender configuration according to claim 1, wherein said first, second and third energy absorption layers, in the assembled state of said energy-absorbing insert, viewed in a direction of a vehicle vertical axis, are disposed one above another and extend respectively over a whole of an insert width.

3. The fender configuration according to claim 1, wherein said first and second insert outer layers are formed from a hard foam material, and said insert middle layer is formed from a foam material being softer than said hard foam material of said first and second insert outer layers.

4. The fender configuration according to claim 1, wherein said first and second insert outer layers are fixedly connected one to the other respectively with said insert middle layer, at least regionally, in at least one plane contact region.

5. The fender configuration according to claim 1, wherein said energy absorbing insert, viewed in cross section, is configured at least regionarly in a U-shape such that, in the assembled state of said energy absorbing insert, said first and second insert outer layers have outer layer arm regions projecting, counter to a direction of travel, oversaid insert middle layer, and defining two U-legs of said U-shape, said first and second insert outer layers each have a respective outer layer base region which together with said insert middle layer disposed therebetween define a U-base of said U-shape, and in that, in the assembled state, said energy-absorbing insert overgrips said fender cross member in approximate form closure such that said outer layer arm regions of said energy-absorbing insert and said insert middle layer bear at least regionally in a plane contact joint against said fender cross member.

6. The fender configuration according to claim 5, wherein:
said fender cross member, viewed in cross section, is configured at least regionally in a U-shape such that, in the assembled state of said fender cross member, said U-shape of said fender cross member has two U-legs disposed approximately horizontally and point counter to the direction of travel and a U-base disposed approximately vertically; and
said fender cross member having a supporting bracket disposed on said U-legs of said fender cross member, said supporting bracket running, at least in a region of said first and second insert outer layers, in the transverse direction of the vehicle, such that, in the assembled state, said first and second insert outer layers can be respectively supported against said supporting bracket in a collision.

7. The fender configuration according to claim 1, wherein said insert middle layer has a plurality of knob-shaped deformation pots defining pot interiors such that said pot interiors form said deformation recesses.

8. The fender configuration according to claim 7, wherein said deformation pots have pot bottoms which, in the assembled state of said energy-absorbing insert, point in a direction of said fender cross member.

9. The fender configuration according to claim 8, wherein said pot bottoms, in the assembled state of said energy-absorbing insert, bear against said fender cross member.

10. The fender configuration according to claim 1, wherein the fender configuration is for a motor vehicle.

11. The fender configuration according to claim 1, wherein said insert middle layer has a plurality of deformation webs, which, in the assembled state of said energy-absorbing insert, run in a direction of a vehicle vertical axis, such that, between said deformation webs, said deformation clearances are configured.

12. The fender configuration according to claim 11, wherein said deformation webs have rectangularly configured cross sections, with a narrow web end face pointing in the direction of travel.

13. The fender configuration according to claim 1, wherein in the assembled state, said energy-absorbing insert has a side facing said fender cover and disposed and runs at a gap distance along an inner contour of said tender cover.

14. A fender configuration for a vehicle, the fender configuration comprising:
at least one fender cross member disposed in a vehicle front end region in a transverse direction of the vehicle;
a fender cover forming an outer skin of the fender configuration; and
at least one energy-absorbing insert, in an assembled state, disposed at least regionally between said fender cross member and said fender cover, said energy-absorbing insert having at least one of a plurality of deformation recesses and deformation clearances formed therein, said energy-absorbing insert being constructed in three layers including a first insert outer layer functioning as a first energy absorption layer, an insert middle layer functioning as a second energy absorption layer, and a second insert outer layer functioning as a third energy absorption layer, said insert middle layer having a different energy absorbency than said first and second insert outer layers, said insert middle layer being associated with said fender cross member such that, in the assembled state of said energy-absorbing insert, said insert middle layer is disposed approximately level with said fender cross member, and said at least one of said deformation recesses and said deformation clearances are configured in said insert middle layer such that, in a collision, if a force acts upon said fender cover, said energy-absorbing insert, in utilizing said at least one of said deformation recesses and deformation clearances, is at least regionally plastically deformable in the transverse direction of the vehicle or in a longitudinal direction of the vehicle, with a small block length for enemy absorption;
said insert middle layer having a plurality of knob-shaped deformation pots defining pot interiors forming said deformation recesses, said deformation pots having pot bottoms which, in the assembled state of said energy-absorbing insert, point in a direction of said fender cross member, and said deformation pots having an open side lying opposite each of said pot bottoms.

15. A fender configuration for a vehicle, the fender configuration comprising:
at least one fender cross member disposed in a vehicle front end region in a transverse direction of the vehicle;
a fender cover forming an outer skin of the fender configuration; and
at least one energy-absorbing insert, in an assembled state, disposed at least regionally between said fender cross member and said fender cover, said energy-absorbing insert having at least one of a plurality of deformation recesses and/or deformation clearances formed therein, said energy-absorbing insert being constructed in three layers including a first insert outer layer functioning as a first energy absorption layer, an insert middle layer functioning as a second energy absorption layer, and a second insert outer layer functioning as a third energy absorption layer, said insert middle layer having a different energy absorbency than said first and second insert outer layers, said insert middle layer being associated with said fender cross member such that, in the assembled state of said energy-absorbing insert, said insert middle layer is disposed approximately level with said fender cross member, and said at least one of said deformation recesses and said deformation clearances are configured in said insert middle layer such that, in a collision, if a force acts upon said fender cover, said energy-absorbing insert, in utilizing said at least one of said deformation recesses and said deformation clearances, is at least regionally plastically deformable in at leaset one of the transverse direction of the vehicle and in a longitudinal direction of the vehicle, with a small block length for energy absorption;
said insert middle layer having a plurality of knob-shaped deformation pots defining pot interiors forming said deformation recesses, said deformation pots being approximately rectangularly configured, said deformation pots having pot walls, and wherein said pot walls running approximately vertically in the assembled state of said energy-absorbing insert run conically, so that a surface area of a respective one of said pot bottoms is smaller than a surface area of an opposite-lying side such that, between approximately vertically running said pot walls, said deformation clearances are configured.

16. A fender configuration for a vehicle, the fender configuration comprising:
    at least one fender cross member disposed in a vehicle front end region in a transverse direction of the vehicle;
    a fender cover forming an outer skin of the fender configuration; and
    at least one energy-absorbing insert, in an assembled state, disposed at least regionally between said fender cross member and said fender cover, said energy-absorbing insert having at least one of a plurality of deformation recesses and/or deformation clearances formed therein, said energy-absorbing insert being constructed in three layers including a first insert outer layer functioning as a first energy absorption layer, an insert middle layer functioning as a second energy absorption layer, and a second insert outer layer functioning as a third energy absorption layer, said insert middle layer having a different energy absorbency than said first and second insert outer layers, said insert middle layer being associated with said fender cross member such that, in the assembled state of said energy-absorbing insert, said insert middle layer is disposed approximately level with said fender cross member, and said at least one of said deformation recesses and said deformation clearances are configured in said insert middle layer such that, in a collision, if a force acts upon said fender cover, said energy-absorbing insert, in utilizing said at least one of said deformation recesses and said deformation clearances, is at least regionally plastically deformable in at least one of the transverse direction of the vehicle and in a longitudinal direction of the vehicle, with a small block length for energy absorption;
    wherein said first and second insert outer layers are fixedly connected one to the other respectively with said insert middle layer, at least regionally, in at least one plane contact region, and said first and second insert outer layers and said insert middle layer, are joined together with foam or bonded fixedly together.

* * * * *